US012013111B2

(12) United States Patent
Luo

(10) Patent No.: US 12,013,111 B2
(45) Date of Patent: Jun. 18, 2024

(54) LIGHT MECHANISM FOR AN UMBRELLA

(71) Applicant: Tempo Manufacturing LLC, Jiangsu (CN)

(72) Inventor: Xiong Luo, Jiangsu (CN)

(73) Assignee: Tempo Manufacturing LLC, Nantong (CN)

( * ) Notice: Subject to any disclaimer, the term of this patent is extended or adjusted under 35 U.S.C. 154(b) by 0 days.

(21) Appl. No.: 18/462,730

(22) Filed: Sep. 7, 2023

(65) Prior Publication Data

US 2024/0085013 A1 Mar. 14, 2024

(30) Foreign Application Priority Data

Sep. 8, 2022 (CN) .......................... 202211092677.3

(51) Int. Cl.
*F21V 33/00* (2006.01)
*F21S 4/28* (2016.01)
*F21S 9/03* (2006.01)
*F21V 23/06* (2006.01)

(52) U.S. Cl.
CPC ............ *F21V 33/0004* (2013.01); *F21S 4/28* (2016.01); *F21S 9/03* (2013.01); *F21V 23/06* (2013.01)

(58) Field of Classification Search
CPC . F21V 23/06; F21V 33/004; F21S 9/03; F21S 4/28
See application file for complete search history.

(56) References Cited

U.S. PATENT DOCUMENTS 11,098,861 B1 * 8/2021 Wang ..................... A45B 23/00

FOREIGN PATENT DOCUMENTS

| CN | 213118859 U | * | 5/2021 | ............... A45B 3/04 |
| DE | 202004012189 U1 | * | 11/2004 | ............... A45B 3/04 |
| GB | 2406272 A | * | 3/2005 | ............... A45B 3/04 |

OTHER PUBLICATIONS

Innovation Q+ NPL Search (Year: 2024).*

* cited by examiner

Primary Examiner — Anabel Ton
(74) Attorney, Agent, or Firm — Wang Law Firm, Inc.

(57) ABSTRACT

A light mechanism for an umbrella, the umbrella comprises a column, a plurality of long rods, a plurality of short rods, a nest and a battery module, the light mechanism comprises at least one light rod assembly. Each long rod has an end, the light rod assembly is detachably connected to the end of the long rod through a rod connector; the light rod assembly comprises a hollow light rod and a light strip arranged inside the light rod, the light strip is electrically connected to a power-supply end of the long rod. The light rod assembly is connected to the long rod by insertion, the female electrical connector is positioned inside the light rod, and the male electrical connector is positioned inside the long rod. The present invention is simple and rational in structure design, convenient and quick to assemble or disassemble. Since the light rod is convenient to disassemble, it is greatly convenient for daily maintenance.

9 Claims, 4 Drawing Sheets

LIGHT MECHANISM FOR AN UMBRELLA

TECHNICAL FIELD OF THE INVENTION

The present invention relates to a field of an umbrella, and in particular to a light mechanism for an umbrella.

BACKGROUND OF THE INVENTION

As a kind of outdoor leisure item, umbrellas are widely applied in squares, beaches, parks, gardens or similar places to shield an individual from sun. In order to make umbrellas used outdoor have a lighting function, umbrellas with solar lights have appeared at present, bringing comfort and convenience to outdoor activities at night in such a way of solar power lighting/decoration in places such as beaches, open-air bars and coffee shops.

However, the existing umbrellas with solar lights still need to be further improved due to the following problems. Firstly, the packaging is too large, resulting in the increase in transportation cost. Secondly, the light strips and the rods in most of the existing solar light umbrellas are integrated, and are difficult to maintain once damaged.

After searching, a Chinese patent CN1864581A (patent No.: CN200610050742.0) disclosed a solar light umbrella, which comprises a column with a column light, wherein an umbrella frame with canopy support long rods is disposed at an upper end of the column; the canopy support long rods are connected to support short rods; a solar receiver and a control switch thereof are arranged on the column light; the support long rods are set as long rod lights, the support short rods are set as short rod lights, and the short rod lights are set as short rods with inner chambers; printed circuit boards are arranged in the inner chambers of the shot rods; the printed circuit boards are connected to illuminators; and, the short rods on the printed circuit boards connected to the control switch are made of transparent materials. The illuminators may be configured to illuminate various colors of light, and the long rod lights, the short rod lights and the column light may be arranged in any combination and collocation mode. The light strip of this solar umbrella light is also integrated with rods, and is also difficult to maintain once damaged.

SUMMARY OF THE INVENTION

It is an object of the present invention to provide a light mechanism for an umbrella, in which the light strip can be disassembled, and which is simple and rational in structure and convenient to assemble, disassemble and maintain.

For achieving the above object, the umbrella comprises a column, a plurality of long rods, a plurality of short rods, a nest and a battery module, the light mechanism comprises at least one light rod assembly. Each long rod has an end, the light rod assembly is detachably connected to the end of the long rod through a rod connector; the light rod assembly comprises a hollow light rod and a light strip arranged inside the light rod, the light strip is electrically connected to a power-supply end of the long rod.

Preferably, the long rod is a hollow tube, the rod connector located inside the end of the long rod is a tube having an inner hole, an inner end which is closed and an outer end which is open; the rod connector has a flange at the outer end of the rod connector which resists against the end of the long rod after the rod connector is inserted inside the end of the long rod; the rod connector has an elastic cylinder located at a periphery of the rod connector, correspondingly, the long rod has a hole for receiving the elastic cylinder after the rod connector is inserted inside the end of the long rod; a male electrical connector defined as the power-supply end of the long rod and a female electrical connector electrically connected to the light strip are arranged between the inner end of the rod connector and the light strip of the rod assembly.

Preferably, a strip-shaped plate is disposed inside the light rod along a length of the light rod, the light rod has a pair of first mounting ribs arranged along the length of the light rod at an inner wall of the light rod below the strip-shaped plate, forming a mounting groove between the strip-shaped plate and the first mounting ribs for receiving the light strip arranged along the length of the light rod; the light rod has an opening at a bottom surface of the light rod, a transparent lampshade is disposed at the bottom of the light rod covering the opening of the light rod.

Preferably, the light rod has a pair of second mounting ribs arranged along the opening of the light rod at the bottom of the light rod; correspondingly, the lampshade has a pair of sliding grooves at the top of the lampshade for receiving the second mounting ribs, the lampshade is capable of sliding along the second mounting ribs to be mounted on the light rod and cover the opening of the light rod.

Preferably, the light rod has two ends, a first tube plug and a second tube plug are respectively arranged at two ends of the light rod; the first tube plug has a mounting hole, the female electrical connector mated with the male electrical connector 4 is positioned inside the mounting hole and defined as an insertion end of the rod assembly; and the female electrical connector is electrically connected to the light strip through a wire, the male electrical connector is electrically connected to the battery module; when the light rod is inserted into the corresponding long rod, the female electrical connector is connected to the male electrical connector.

Preferably, the light rod and the first tube plug match with the inner hole of the rib connector, the light rod has two bumps at the inner wall of the rod connector for clamping the light rod.

Preferably, the rod connector has a pair of slots on a top surface of the rod connector at two sides of the elastic cylinder to make the elastic cylinder able to flex up and down.

Preferably, the male electrical connector and the female electrical connector are a pair of plug and socket or one or more mated electrical connector.

Preferably, the battery module is a solar rechargeable battery.

Preferably, the long rod is a hollow square tube, or a rectangular tube, or a circular tube or an oval tube, and the rod connector and the light rod are correspondingly square tubers, or rectangular tubes, or circular tubes or oval tubes.

Compared with the prior art, the present invention has the following advantages. The light rod assembly with the light strip is connected to the long rod by insertion manner, the female electrical connector is positioned inside the light rod, and the male electrical connector is positioned inside the long rod. When in use, the light rod assembly is inserted into the end of the long rod to complete assembly of the light rod assembly, at the same time the male electrical connector is electrically connected to the female electrical connector, so that the light strip can be lighted for illumination. The present invention is simple and rational in structure design, convenient and quick to assemble or disassemble. Since the light rod assembly is convenient to disassemble, it is greatly convenient for daily maintenance.

DETAILED DESCRIPTION OF THE INVENTION

Figure 1:
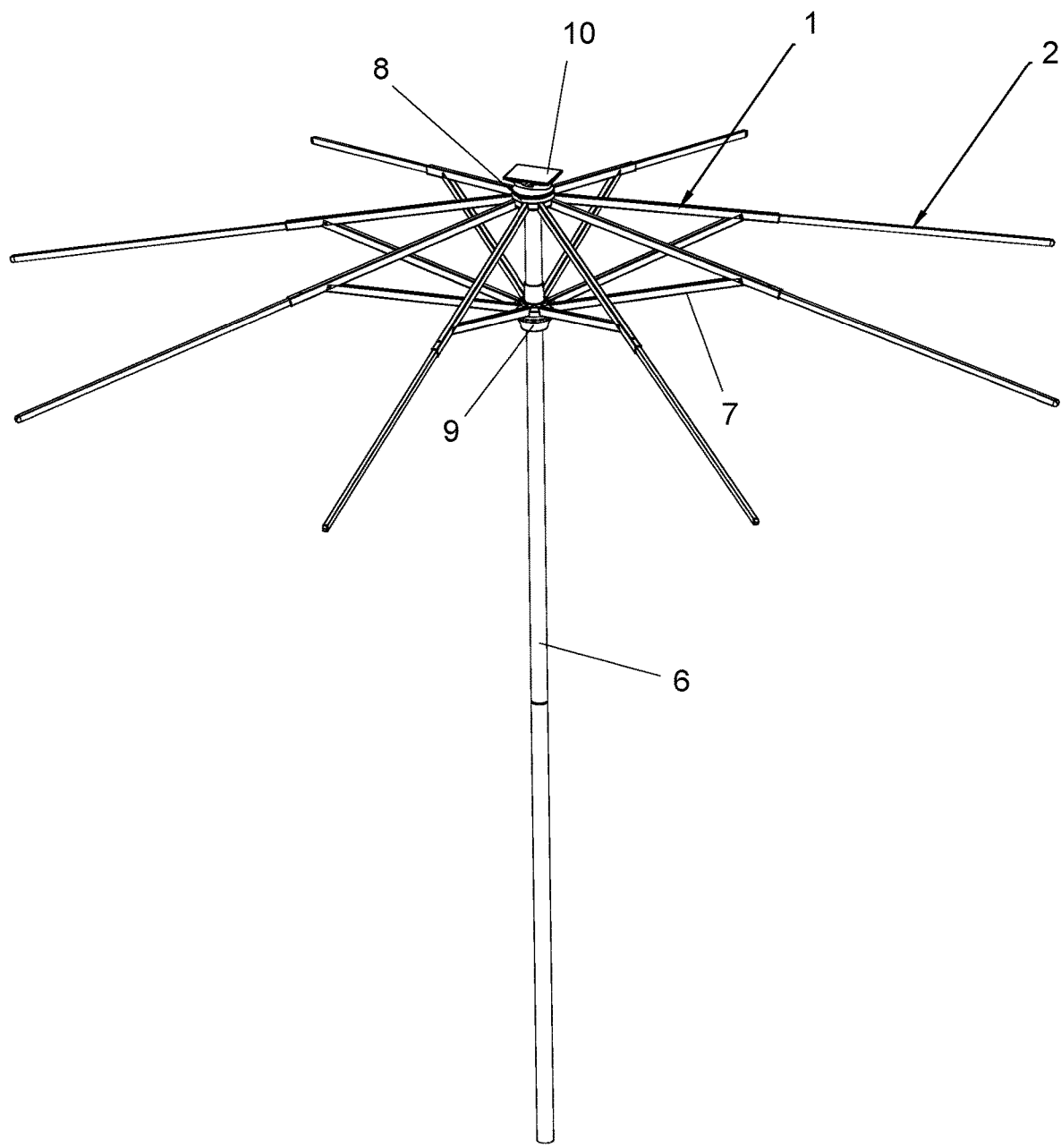
FIG. 1 is a perspective view of a light mechanism used on a center-support umbrella according to an embodiment of the present invention.
Figure 2:
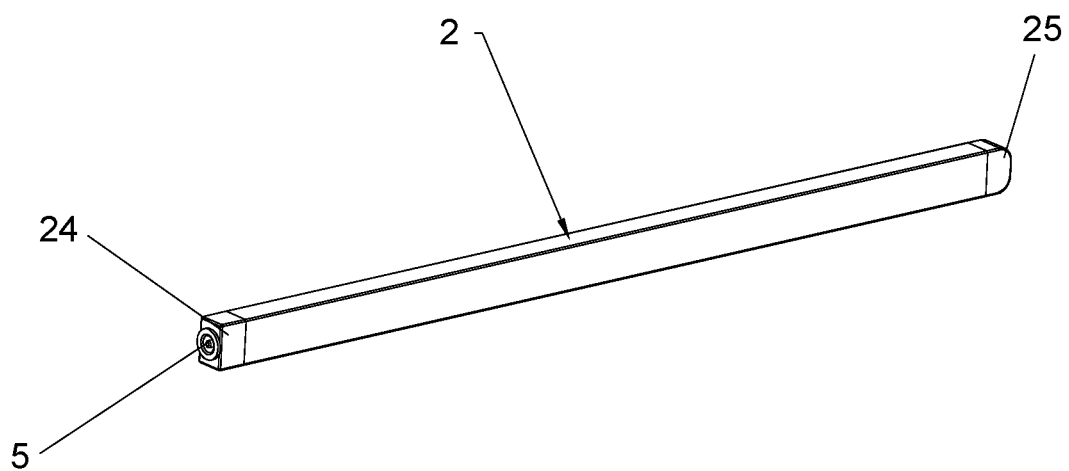
FIG. 2 is a perspective view of a light rod assembly according to the embodiment of the present invention.
Figure 3:
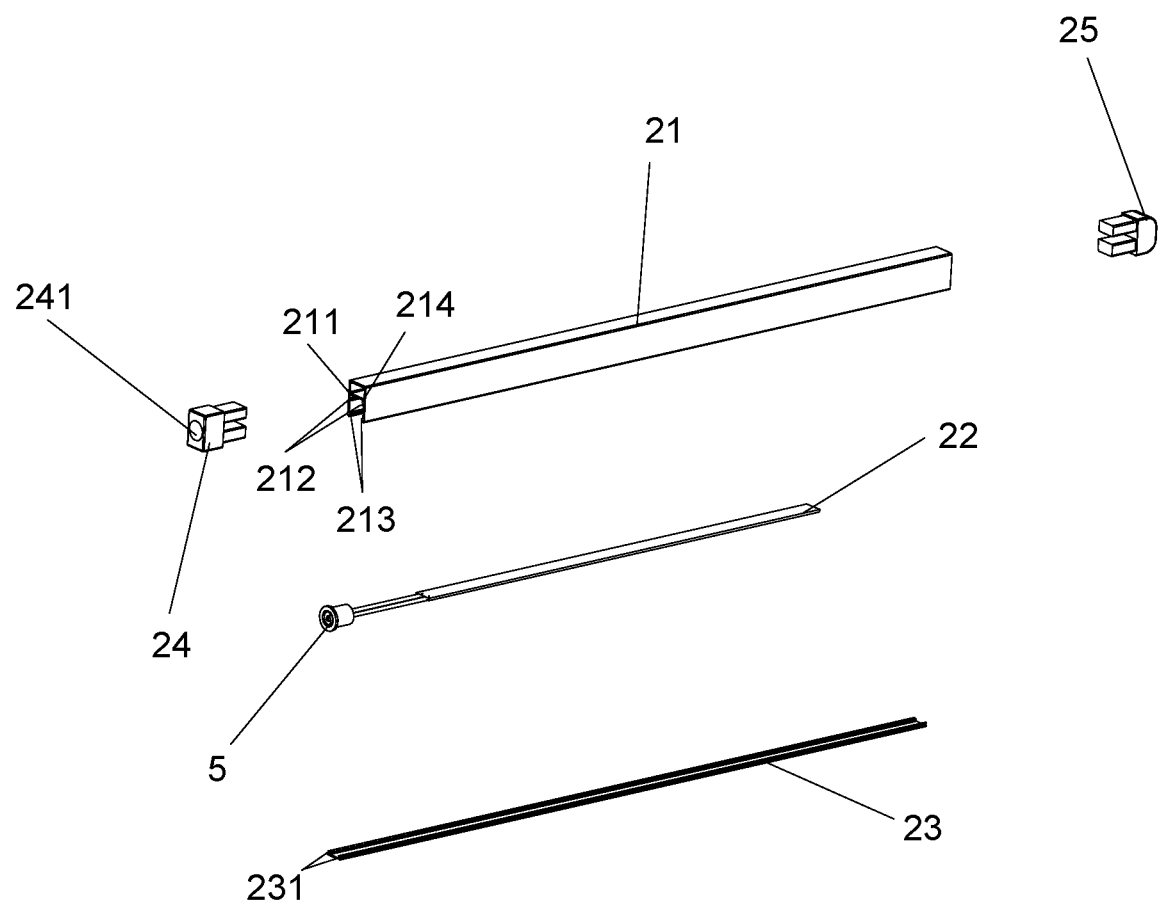
FIG. 3 is an exploded view of FIG. 2.
Figure 4:
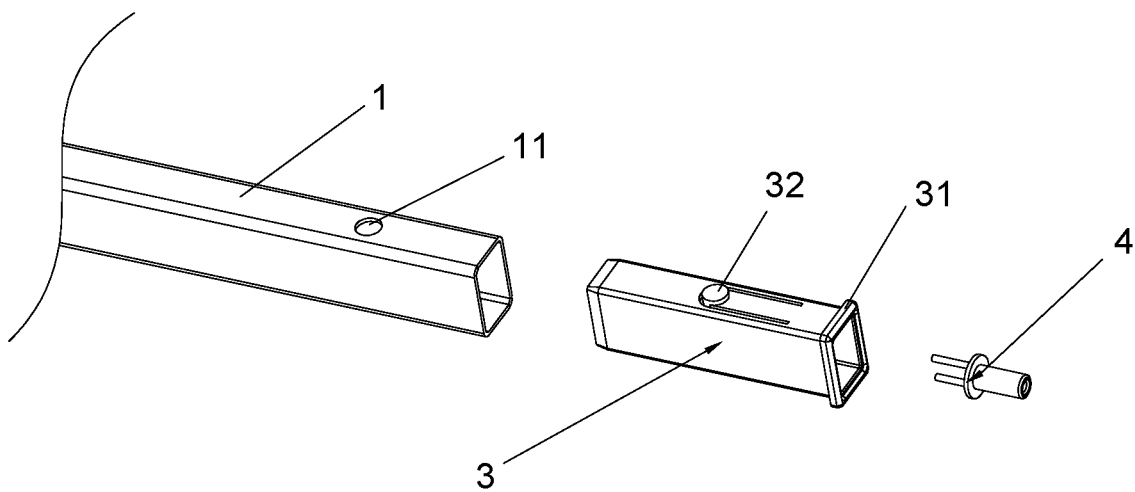
FIG. 4 is an exploded view of a long rod and a rod connector according to the embodiment of the present invention.
Figure 5:
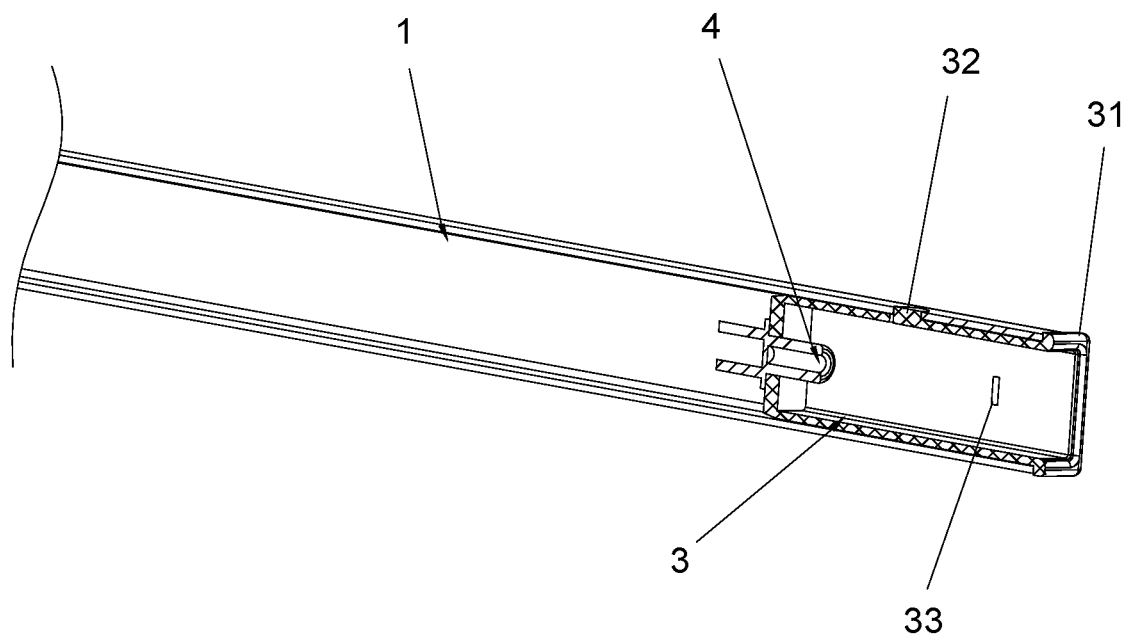
FIG. 5 is a sectional view of a part of the long rod with the rod connector according to the embodiment of the present invention.
Figure 6:
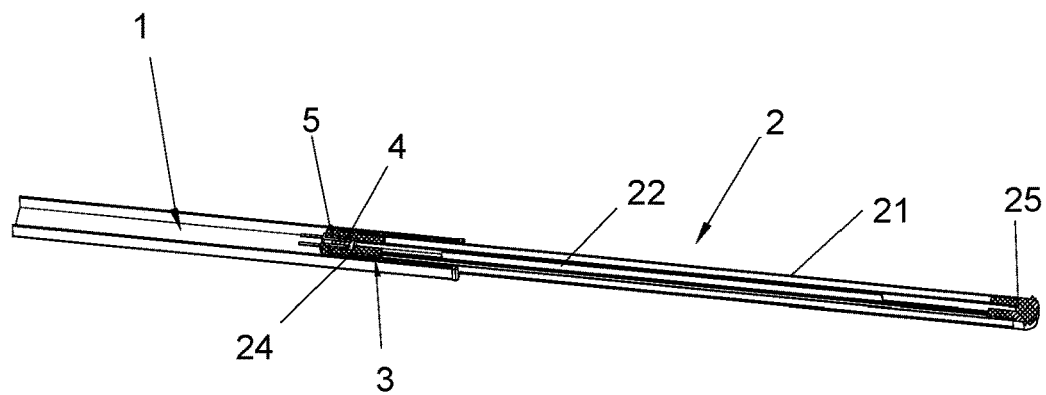
FIG. 6 is a sectional view of the long rod and the light rod assembly when they are connected by insertion manner.

The present invention will be further described below in detail by embodiments with reference to the accompanying drawings.

FIGS. 1-6 show a preferred embodiment of the light mechanism for an umbrella of the present invention. The light mechanism in this embodiment is applied to a center-support umbrella. The umbrella comprises a column 6, a plurality of long rods 1, a plurality of short rods 7, an upper nest 8, a lower nest 9 and a battery module. The light mechanism comprises multiple of light rod assemblies 2. The battery module is a solar rechargeable battery, and comprises a solar module 10. Each long rod 1 has a tail end, the light rod assembly 2 is detachably connected to the tail end of the long rod 1 through a rod connector 3. The light rod assembly 2 comprises a hollow light rod 21 and a light strip 22 arranged inside the light rod 21, the light strip 22 is electrically connected to a power-supply end of the long rod 1.

Specifically, the long rod 1 is a hollow tube, the rod connector 3 located inside the tail end of the long rod 1 is a tube having an inner hole, an inner end which is closed and an outer end which is open. The rod connector 3 has a flange 31 at the outer end of the rod connector 3 which resists against the tail end of the long rod 1 after the rod connector 3 is inserted inside the tail end of the long rod 1. A male electrical connector 4 disposed inside an inner end of the rod connector 3, is defined as the power-supply end of the long rod 1 after the male electrical connector 4 is electrically connected to the battery module 10 through wires in the long rod. The rod connector 3 has an elastic cylinder 32 located at a periphery of the rod connector 3, and a pair of slots on a top surface of the rod connector 3 at two sides of the elastic cylinder 32 to make the elastic cylinder 32 able to flex up and down, correspondingly, the long rod 1 has a hole 11 for receiving the elastic cylinder 32 after the rod connector 3 is inserted inside the tail end of the long rod 1. The light rod 21 has an opening at a bottom surface of the light rod 21. A strip-shaped plate 211 is disposed inside the light rod 21 along a length of the light rod 21, so that the light rod 21 is defined as an upper slot and the overall rigidity and strength of the light rod 2 are enhanced. The light rod 21 has a pair of first mounting ribs 212 arranged along the length of the light rod 21 at an inner wall of the light rod 21 below the strip-shaped plate 211, forming a mounting groove 214 between the strip-shaped plate 211 and the first mounting ribs 212 for receiving the light strip 22 arranged along the length of the light rod 21. The light rod assembly 2 is also comprises a transparent lampshade 23, a first tube plug 24 and a second tube plug 25. The light rod 21 has a pair of second mounting ribs 213 arranged along the opening of the light rod 21 at the bottom of the light rod 21, correspondingly, the lampshade 23 has a pair of sliding grooves 231 at the top of the lampshade 23 for receiving the second mounting ribs 213, the lampshade 23 is capable of sliding along the second mounting ribs 213 to be mounted on the light rod 21 and cover the opening of the light rod 21, each second mounting rib 213 inserts into the corresponding sliding groove 231. The light rod 21 has two ends, a first tube plug 24 and a second tube plug 25 are respectively arranged at two ends of the light rod 21; the first tube plug 24 has a mounting hole 241, the female electrical connector 5 mated with the male electrical connector 4 is positioned inside the mounting hole 241 and defined as an insertion end of the rod assembly 2; and the female electrical connector 5 is electrically connected to the light strip 22 through a wire, the male electrical connector 4 is electrically connected to the battery module 10; when the light rod 21 is inserted into the corresponding long rod 1, the female electrical connector 5 is connected to the male electrical connector 4, so that the light strip 22 can be powered on. The light rod 21 and the first tube plug 24 match with the inner hole of the rod connector 3, and the light rod 21 has two bumps 33 at the inner wall of the rod connector 3 for clamping the light rod 21.

The long rod 1 in this embodiment is a hollow square tube, or a rectangular tube, or a circular tube or an oval tube, and the rod connector 3 and the light rod 21 are correspondingly square tubes, or rectangular tubes, or circular tubes or oval tubes.

Figure 7:
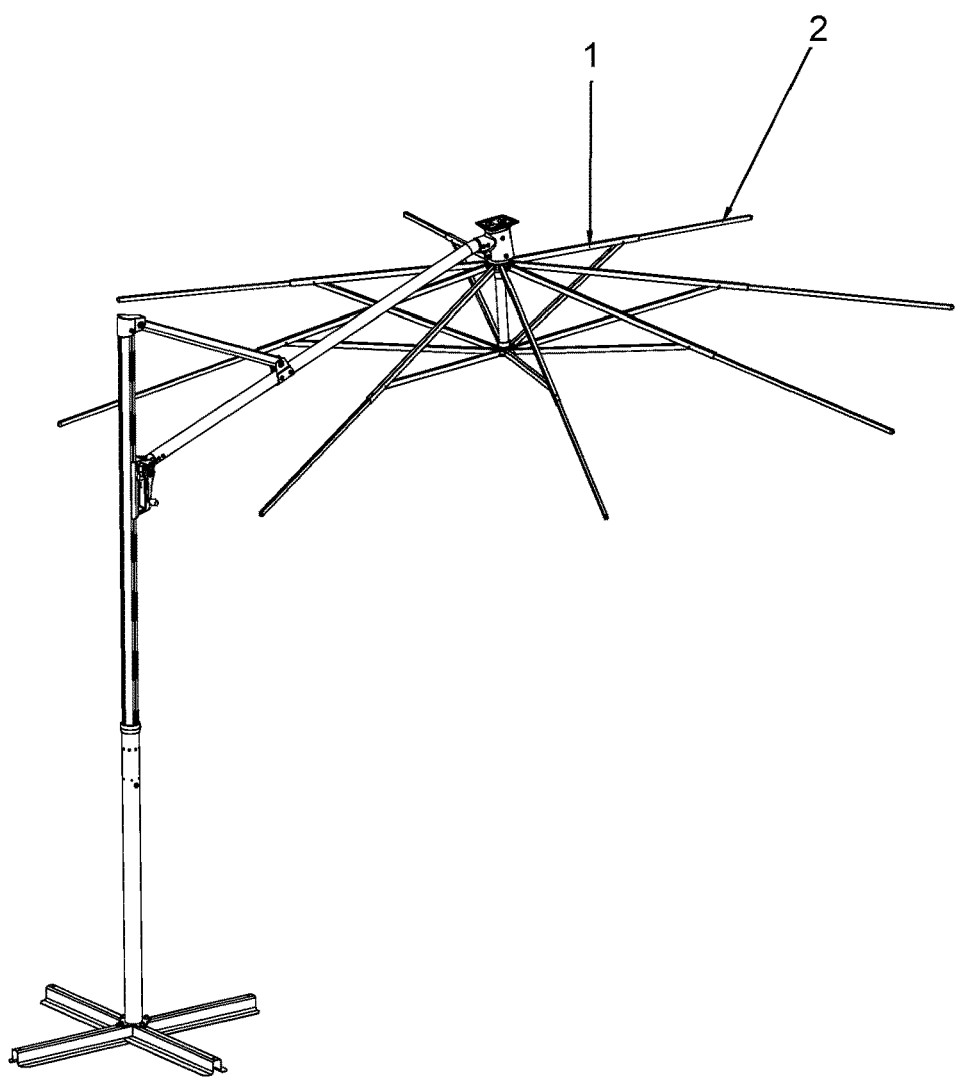
FIG. 7 is a perspective view of the light mechanism used on a side-support umbrella according to the embodiment of the present invention.

In addition, the light mechanism for an umbrella powered by solar is not limited to a center-support umbrella, and also can be used on a side-support umbrella, as shown in FIG. 7.

During assembling, the rod connector 3 is inserted into the tail end of the long rod 1, and the assembled rib assembly 2 having the light strip 22 placed in is aligned with the rod connector 3 and then inserted into the long rod 1. The long rod 1 has the hole 11 for receiving the elastic cylinder 32 for the rod connector 3 being positioned on the long rod 1. At this time, the male electrical connector 4 is connected to the female electrical connector 5, so that the light strip 22 can be powered on, achieving illumination.

When it is necessary to maintain or replace the light strip 22, the elastic cylinder 32 is pressed down, and the light strip 22 can be taken out only after the light rod assembly 2 is pulled out and the first tube plug 24 is removed. Therefore, it is convenient and quick to assemble or disassemble, and it is convenient to maintain.

The protection scope of the present invention is not limited to each embodiment described in this description. Any changes and replacements made on the basis of the scope of the present invention patent and of the description shall be included in the scope of the present invention patent.

The invention claimed is:

1. A light mechanism for an umbrella, the umbrella comprising a column, a plurality of long rods, a plurality of short rods, a nest and a battery module, the light mechanism comprising at least one light rod assembly;

wherein,
each long rod has an end, the light rod assembly is detachably connected to the end of the long rod through a rod connector, each long rod is a hollow tube, the rod connector located inside the end of the long rod is a tube having an inner hole, an inner end which is closed and an outer end which is open;

the rod connector has a flange at the outer end of the rod connector which resists against the end of the long rod after the rod connector is inserted inside the end of the long rod;

the rod connector has an elastic cylinder located at a periphery of the rod connector, correspondingly, the long rod has a hole for receiving the elastic cylinder after the rod connector is inserted inside the end of the long rod;

the light rod assembly comprises a hollow light rod and a light strip arranged inside the light rod, the light strip is electrically connected to a power-supply end of the long rod;

a male electrical connector defined as the power-supply end of the long rod and a female electrical connector electrically connected to the light strip are arranged between the inner end of the rod connector and the light strip of the rod assembly.

2. The light mechanism of claim 1, wherein a strip-shaped plate is disposed inside the light rod along a length of the light rod, the light rod has a pair of first mounting ribs arranged along the length of the light rod at an inner wall of the light rod below the strip-shaped plate, forming a mounting groove between the strip-shaped plate and the first mounting ribs for receiving the light strip arranged along the length of the light rod;

the light rod has an opening at a bottom surface of the light rod, a transparent lampshade is disposed at the bottom of the light rod covering the opening of the light rod.

3. The light mechanism of claim 2, wherein the light rod has a pair of second mounting ribs arranged along the opening of the light rod at the bottom of the light rod; correspondingly, the lampshade has a pair of sliding grooves at the top of the lampshade for receiving the second mounting ribs, the lampshade is capable of sliding along the second mounting ribs to be mounted on the light rod and cover the opening of the light rod.

4. The light mechanism of claim 1, wherein the light rod has two ends, a first tube plug and a second tube plug are respectively arranged at two ends of the light rod;

the first tube plug has a mounting hole, the female electrical connector mated with the male electrical connector is positioned inside the mounting hole and defined as an insertion end of the rod assembly;

and the female electrical connector is electrically connected to the light strip through a wire, the male electrical connector is electrically connected to the battery module;

when the light rod is inserted into the corresponding long rod, the female electrical connector is connected to the male electrical connector.

5. The light mechanism of claim 4, wherein the light rod and the first tube plug match with the inner hole of the rod connector, and the light rod has two bumps at the inner wall of the rod connector for clamping the light rod.

6. The light mechanism of claim 1, wherein the rod connector has a pair of slots on a top surface of the rod connector at two sides of the elastic cylinder to make the elastic cylinder able to flex up and down.

7. The light mechanism of claim 1, wherein the male electrical connector and the female electrical connector are a pair of plug and socket or one or more mated electrical connector.

8. The light mechanism of claim 1, wherein the battery module is a solar rechargeable battery.

9. The light mechanism of claim 1, wherein the long rod is a hollow square tube, or a rectangular tube, or a circular tube or an oval tube, and the rod connector and the light rod are correspondingly square tubes, or rectangular tubes, or circular tubes or oval tubes.

* * * * *